United States Patent [19]

Kumar

[11] Patent Number: 5,170,105
[45] Date of Patent: Dec. 8, 1992

[54] METHOD FOR DETERMINING OPERABILITY OF AN ELECTRICAL DYNAMIC BRAKING SYSTEM

[75] Inventor: Ajith K. Kumar, Erie, Pa.

[73] Assignee: General Electric Company, Erie, Pa.

[21] Appl. No.: 666,758

[22] Filed: Mar. 8, 1991

[51] Int. Cl.$^5$ ............................................. H02P 3/00
[52] U.S. Cl. ..................................... 318/362; 318/375
[58] Field of Search ................... 324/509–511, 324/522, 158 MG, 126, 128; 318/362, 366, 370, 371, 375, 379, 380, 86, 87, 382, 490; 73/117.2

[56] References Cited

U.S. PATENT DOCUMENTS

| | | | |
|---|---|---|---|
| 3,890,551 | 6/1975 | Plunkett | 318/376 |
| 3,961,688 | 6/1976 | Maynard | 187/333 X |
| 4,092,577 | 5/1978 | Markham | 318/370 |
| 4,093,900 | 6/1978 | Plunkett | 318/370 |
| 4,352,049 | 9/1982 | Franz, Jr. | 318/370 |
| 4,450,388 | 5/1984 | Markham | 318/87 |
| 4,695,941 | 9/1987 | Kumar | 318/565 X |
| 4,743,078 | 5/1988 | Dahnert | 318/375 X |
| 4,761,600 | 8/1988 | D'Atre et al. | 318/759 |
| 4,843,297 | 6/1989 | Landino et al. | 318/811 |
| 4,902,954 | 2/1990 | Oshima et al. | 318/806 X |
| 4,904,918 | 2/1990 | Bailey et al. | 318/762 |

Primary Examiner—A. Jonathan Wysocki

[57] ABSTRACT

A method for determining operability of a dynamic braking system in an electrically propelled traction vehicle by cycling selected switching devices while the vehicle is at rest and measuring voltages and currents generated in response to operation of the switching devices. In one form, the dynamic braking system is operated to be connected to a power conversion system of the vehicle and the voltage developed at the braking system compared to the voltage coupled to the vehicle. Using prior knowledge of system resistances, calculated ideal values of voltage are compared to measured values to confirm proper system operation. Malfunctions of particular components are logically determined by ratios of measured to ideal values and by operation of selected ones of the switching devices.

10 Claims, 5 Drawing Sheets

METHOD FOR DETERMINING OPERABILITY OF AN ELECTRICAL DYNAMIC BRAKING SYSTEM

This invention relates to electric power conversion systems for conveying power between a direct current (DC) source and an electric load circuit and, more particularly, to a method for evaluating operability of selected components and circuits in such conversion systems without disassembly of such systems.

BACKGROUND OF THE INVENTION

Electric power conversion systems are used to condition the electric power supplied to motor load circuits from a DC source of relatively constant voltage. If supplying DC motors, such a system will include an electric power "chopper" that is suitably controlled to vary the magnitude of load current and/or voltage is desired. Alternatively, in the case of alternating current (AC) motors, the system will include an electric power "inverter" that is suitably controlled to vary the amplitude and frequency of load voltage as desired. In either case, electric power flows from the DC source terminals to the load terminals of the controllable converter during "motoring" operation or in a reverse direction during "electrical braking".

Such a system is useful for propelling a rapid transit vehicle, in which case the source comprises a wayside conductor and the load comprises windings of at least one traction motor whose rotatable shaft is mechanically coupled through torque-increasing gearing to an axle-wheel set of the vehicle. The wayside conductor is typically energized by a relatively low voltage DC power generating plant located near the right of way along which the vehicle travels. In its motoring or propulsion mode of operation, the converter is so controlled that the DC voltage applied to its source terminals is converted into adjustable voltage at its load terminals, and the traction motor(s) responds by producing torque to accelerate the vehicle or maintain its speed as desired.

In the alternative electrical braking or retarding mode of operation of the power conversion system, the converter is so controlled that each motor acts as a generator driven by the inertia of the vehicle and supplies electric power which flows in a reverse direction through the converter and appears as direct and unipolarity voltage at the source terminals. As this electrical energy is used or dissipated, the traction motor(s) responds by absorbing kinetic energy and slowing the vehicle. Electrical braking is achieved by a combination of dynamic braking and regenerative braking. Dynamic braking is effected by connecting a dynamic braking resistance between the DC source terminals. This resistance receives current from the converter, converts the electrical energy to thermal energy, and dissipates the resulting heat. Regenerative braking, on the other hand, is effected by returning to the DC power source power flowing in a reverse direction through the converter during braking operation. These two electrical braking modes can be combined in desired proportions, this mixing process being commonly referred to as "blending".

A power conversion system including a voltage source inverter for supplying AC traction motors is disclosed in U.S. Pat. No. 3,890,551 —Plunkett, assigned to General Electric Company. An important feature of the Plunkett power conversion system is its inclusion of ohmic resistance (shown at 28 in FIG. 1 of the Plunkett patent) that is inserted into the DC link between the inverter and the DC power source during electrical braking but is effectively removed from the DC link during motoring. By inserting this series resistor during electrical braking, the magnitude of voltage at the DC terminals of the inverter can increase above that of the source voltage. One of the advantages of raising the inverter voltage is to enable the traction motors to develop more magnetic flux for braking and to use less current than would otherwise be required for very high braking effort.

The power conversion system of the Plunkett patent also includes a low pass electrical filter of the conventional series inductance (L), shunt capacitance (C) type between the voltage raising resistor and the inverter for attenuating harmonics generated by operation of the inverter and for partially isolating the inverter from undesirable line transients. (As used herein, the term "harmonics" refers to various components of the composite current and voltage waveforms having frequencies that are multiples of the frequency of the fundamental component of such waveforms.) In addition, the shunt capacitance of the filter at the DC terminals of the inverter provides the "stiff" voltage required for proper operation of a voltage source inverter.

The desired blending of dynamic and regenerative braking can be accomplished in various different ways that are well known to persons skilled in the art. See, for example, U.S. Pat. No. 4,093,900 —Plunkett. In the present state-of-the-art, it is preferable to replace the parallel array of separate braking resistors and their respectively associated electromechanical switches, as shown in U.S. Pat. No. 4,093,900, with a single bank of resistance elements connected to the DC link via an electric power chopper comprising a controllable solid-state electric valve that can be repetitively turned on and off in a pulse width modulation (PWM) mode to control the average magnitude of current in the resistor as desired. An example of this modern practice is disclosed in U.S. Pat. No. 4,761,600 —D'Atre et al., where the electric valve comprises a main thyristor for commutating the main SCR from a conducting state (on) to a non-conducting or current blocking state (off). Alternatively, a solid-state gate turn-off device (GTO) could be substituted for the chopper shown in U.S. Pat. No. 4,761,600.

As discussed above, the capacitance means also operates in conjunction with the electrical braking system for the transit vehicle. A more detailed description of the operation of an electrical braking system may be had by reference to U.S. Pat. No. 4,904,918 —Bailey et al., issued Feb. 27, 1990 and assigned to the assignee of the present invention. Reference is also made to U.S. patent application Ser. No. 07/630,698 filed Dec. 20, 1990, also assigned to the assignee of the present invention, the disclosure of which is hereby incorporated by reference. During electrical braking of the transit vehicle, the capacitance means is called upon to attenuate harmonics generated by the operation of the chopper in varying the dynamic braking resistance.

A primary concern of transit vehicle operation is the integrity of the above described electrical dynamic braking system. As described in the aforementioned U.S. Pat. No. 4,904,918, a propulsion system for a transit vehicle typically utilizes two power circuits each connected for driving a pair of traction motors. Each power circuit is coupled to input power lines through a corresponding filter circuit such that the filter circuits are essentially in parallel. Each filter circuit incorporates a dynamic braking circuit which are also essentially in parallel circuit arrangement. Since a failure in either of the dynamic braking circuits may detrimentally affect electrical retard of the transit vehicle, it is desirable to provide a means for verifying integrity of the braking circuits so as to allow for early maintenance.

SUMMARY OF THE INVENTION

It is a general object of the present invention to provide a method for verifying integrity of selected components in a power conversion system without requiring disassembly of the system.

It is another object to provide a method for verifying operation of a dynamic braking circuit in a power conversion system.

The above and other objects will be in part apparent and in part pointed out in the description to follow. In general, the invention is illustrated as a method for determining operability of the dynamic braking systems of a transit vehicle. In one form, the method is implemented as a software program operable in a microcomputer based control for the transit vehicle. The program selectively energizes contactors and dynamic braking systems while the transit vehicle is at rest and measures voltage and currents responsive to the contactors energization. The measured voltages are compared with ideal, predetermined voltages to determine proper operation of the system. Deviations between measured voltages and ideal voltages are further evaluated to locate specific fault conditions. In general, a failure to detect current to the power conversion system is indicative of an open circuit between the wayside conductor and the power system. Voltages less than ideal at the conversion system are indicative of short circuited dynamic braking resistors while voltages higher than ideal are indicative of open circuits in the dynamic braking circuits.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
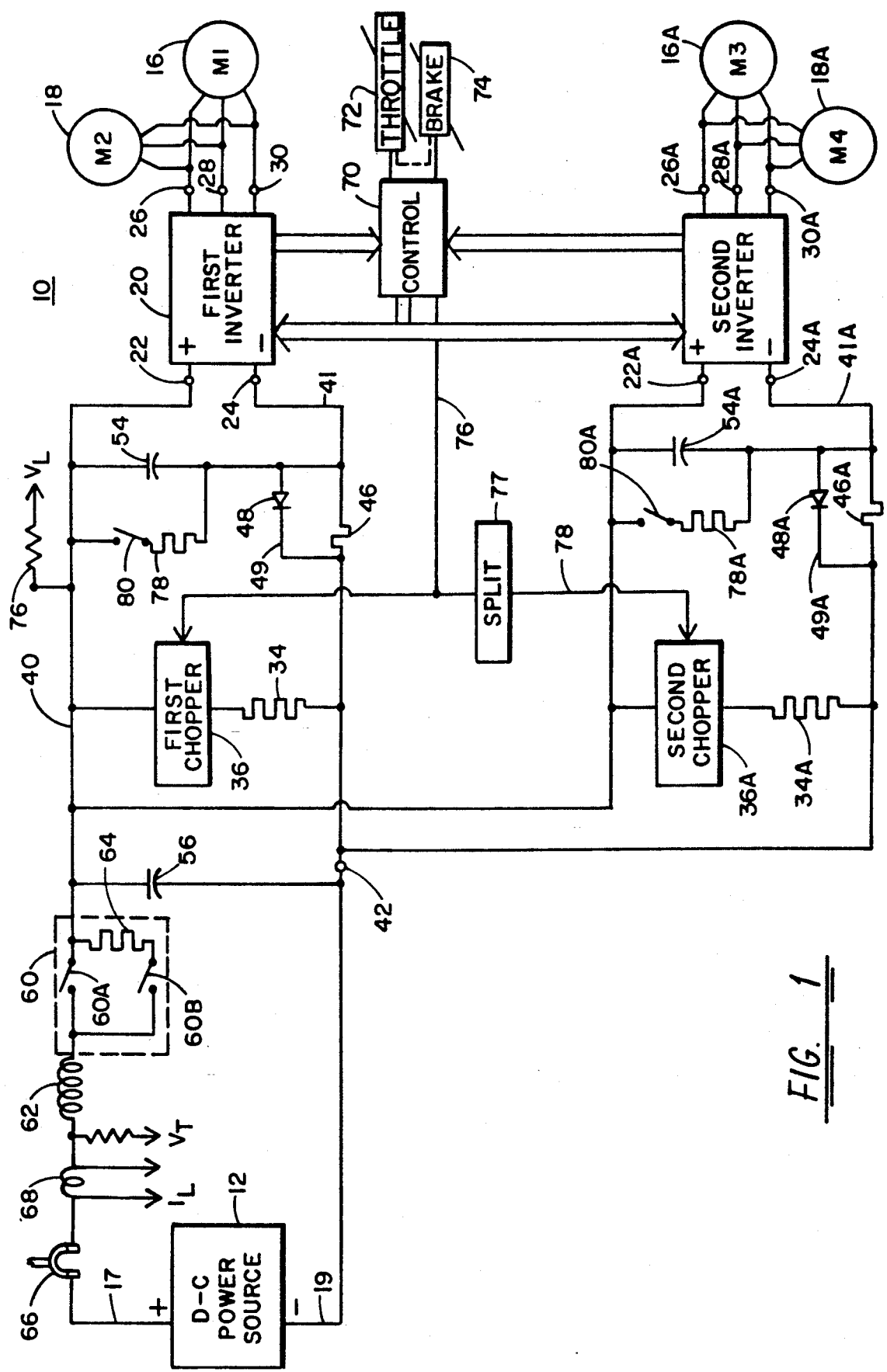
FIG. 1 is a simplified partial schematic, partial block diagram of a power conversion system for a traction vehicle.

Referring now to FIG. 1, there is shown a power conversion system 10 for conveying power between a DC power source 12 and an electric load comprising first and second motors 16 and 18 electrically connected in parallel. In one application of the invention, the motors 16 and 18 are three-phase AC induction-type traction motors used for propelling a transit vehicle (not shown), and the DC source 12 comprises a wayside power distribution system including either a third rail or an overhead catenary with which a current collector on the vehicle makes sliding or rolling contact. In FIG. 1, the relatively positive line 17 represents such a current collector, and the negative line 19 represents a conductor in contact with a grounded rail serving as the other terminal of the DC source. Alternatively, the power conversion system 10 on board the vehicle may be connected to the source via a two-wire trolley in contact with two parallel conductors of an overhead catenary. The magnitude of the unipolarity voltage between the lines 17 and 19 is typically in a range from 600 volts normal to 800 volts maximum, and each of the motors 16 and 18 typically has a full-load rating on the order of 300 horsepower more or less.

The power conversion system 10 includes a controllable converter 20 which, in the illustrated embodiment of the invention, is a voltage source inverter having a pair of DC terminals 22 and 24 on its source side and a set of three AC terminals 26, 28, and 30 on its motor side. The DC terminal 22 is connected via a conductor 40 to the lines 17 of the positive potential, and the terminal 24 is connected via relatively negative conductors 41 and 42 to the other lines 19 of the DC power source 12. The conductors 40-42 thus serve as a DC link between the source 12 and the inverter 20. The AC terminals 26, 28, and 30 are respectively connected to the three different phases of each of the AC motors 16 and 18.

During motoring, i.e., when electrical power is being conveyed from the source to the motors, direct current is supplied to the inverter through its DC terminals 22 and 24, and the inverter acts to convert this direct current into alternating current supplied through AC terminals 26, 28, and 30 to the motors 16 and 18. The inverter is of a conventional design and includes suitable controls (not shown in FIG. 1) for varying the amplitude and frequency of the alternating voltage at its AC terminals to provide the needed acceleration or deceleration of the vehicle driven by the motors 16 and 18. The well known pulse width modulated (PWM) control strategy can be used. Examples of useful inverters are disclosed in U.S. Pat. Nos. 3,890,551 and 4,761,600. In modern practice, GTO devices are preferred as the main controllable electrical valves of the inverter, thereby avoiding the need for auxiliary thyristors and commutation circuits. The power conversion system 10 has alternative motoring and electrical braking modes of operation. During electrical braking, each of the motors 16 and 18 operates as an electrical generator driven by the inertia of the transit vehicle, returning power to the system 10. This return power flows through the inverter 20 in a reverse direction from the direction of flow during motoring and appears as a unipolarity voltage and direct current at the DC terminals 22 and 24.

The conversion system 10 is designed to provide for both dynamic braking and regenerative braking. Dynamic braking is effected by connecting across the conductors 40 and 42 of the DC link a dynamic braking resistance 34 through which at least some of the braking current can be made to flow, thus dissipating electric energy in the form of heat. For controlling current in the resistance 34, an electric power chopper 36 is connected in series therewith. As is well known to persons skilled in the art, the chopper 36 is a solid-state switch than can be repetitively turned on and off by suitable control means (not shown in FIG. 1) that, in one form, controls the ratio of the "on time" to the "off time" during successive intervals each of fixed duration. The average magnitude of current in the resistance varies directly with this ratio.

Regenerative braking is effected by returning reversely-flowing power to the DC source 12. During this mode of braking, braking current from the DC terminals 22 and 24 flows through the source 12 via the DC link conductors 40, 41, and 42. Regenerated power can be used for propelling other vehicles connected to the wayside conductor and then drawing power from the same source. But, as noted in U.S. Pat. No. 4,093,900, there are many instances when a power source is not receptive enough to use all of the electrical braking energy, and in such instances some energy must be dissipated in the dynamic braking resistance 34. The chopper control is able to sense such conditions and to respond by varying the on-off ratio of the chopper appropriately. One approach for controlling electrical braking is to use only the regenerative braking mode as long as the resulting braking effort is sufficient, but to blend in dynamic braking effort when regenerative braking effort drops below the desired level.

For increasing the effectiveness of the braking action, additional ohmic resistance means 46 is connected between the two negative conductors 41 and 42 on one side of the DC link so that it is in the path of current flowing from the relatively negative line 19 of the DC power source 12 and/or the dynamic braking circuit 34, 36 to the negative DC terminal 24 of the inverter during electrical braking. This resistance means 46 is shunted by a bypass circuit 49 including suitable means 48, such as the illustrated diode, for effectively removing the resistor 46 from the DC link during monitoring (i.e., when current in the conductors 41 and 42 flows in the direction of arrow 47 from the negative DC terminal 24 of the inverter 20 to the negative line 19 of the source 12). The diode 48 in the bypass circuit 49 is poled, as is shown in FIG. 1, to present negligible resistance to current in the direction of the arrow 47, but during electrical braking it blocks current which now flows in an opposite direction through conductors 41 and 42, thereby forcing such current to flow through the resistor 46. By thus effectively inserting the resistor 46 into the path of braking current, the voltage developed between the DC terminals 22 and 24 of the inverter will have a substantially higher magnitude than the voltage between conductors 40 and 42 of the DC link. Consequently, the amplitude of the motor voltage will rise above the magnitude of source voltage when the motors are acting as generators during electrical braking.

Such increased voltage is highly advantageous because it enables the motors to develop more flux for braking, and very high braking effort can be obtained with less current than would otherwise be possible. In a typical transit vehicle, the peak braking power will be much higher than the maximum power for propulsion. Keeping the maximum current as low as possible during braking has the additional benefit of avoiding the need for larger diameter and more expensive solid-state electrical valves in the inverter 20. This action and its other advantages are explained in more detail in the previously referenced U.S. Pat. No. 3,890,551. It is apparent that the extra resistor 46 will always absorb a portion of the electrical braking power even when the source 12 is highly receptive and there is no current in the dynamic braking circuit 34, 36. During regenerative braking, the resistor 46 provides an additional benefit: it helps to isolate the inverter 20 from the voltage between the lines 17 and 19, which voltage may experience sudden magnitude swings in either a positive or negative direction and lasting for many milliseconds due to lightning strokes, opening and closing of line breakers, or the like. The presence of the resistor 46 gives the inverter control circuits some additional time to respond to these sudden voltage changes in a safe and controlled manner.

For attenuating harmonics generated by operation of the power conversion system 10 and for effectively isolating the system from any undesirable electrical transients in the DC power source 12, a single-stage electrical filter of the L-C type is included in the connections between the source 12 and the inverter 20. This filter comprises a series line-filter inductance means 62 connected in the path of current between the line 17 and the positive conductor 40 of the DC link, and shunt capacitance means 54, 56. In accordance with the present invention, the shunt capacitance means actually comprises two separate parallel banks of capacitors. The first capacitance means 54 (referred to as the DC link capacitor) spans the conductors 40 and 41 and thus is directly connected between the two DC terminals 22 and 24 of the inverter. The second capacitance means 56 (referred to as the line capacitor) spans the conductors 40 and 42 and thus is interconnected in parallel with the capacitance means 54 via a circuit that includes the additional resistor 46 and its bypass circuit 49. During motoring, the bypass circuit around the resistor 46 is in its low resistance state as described above, essentially the same voltage is applied across both of the capacitors 54 and 56, and the effective value of capacitance in the filter is the sum of the capacitance values of the capacitors 54 and 56. But during electrical braking (when braking current is flowing in a direction opposite to the arrow 47), the resistor 46 is inserted in the path of braking current between the line capacitor 56 and the DC link capacitor 54, and the voltage magnitude across the former capacitor will now be less than the voltage across the capacitor 54 by an amount equal to the voltage drop across resistor 46.

In either mode of operation, the filter serves to attenuate harmonics generated by operation of the inverter 20 so that such harmonics are isolated from the DC source 12 and will not interfere with the usual wayside signalling system. During motoring, the DC link capacitor 54 serves mainly as the required "stiff" voltage source for the inverter 20. In the electrical braking mode of operation, the line capacitor 56 serves mainly as a filter for the chopper 36, providing a temporary path for braking current during the off periods of the chopper in the dynamic braking circuit 34, 36 which, as can be seen in FIG. 1, is connected across this capacitor. In addition to attenuating chopper-generated harmonics, the filter cooperates with the resistor 46 to dampen the inverter-generated harmonics during electrical braking.

For disconnecting the power conversion system 10, an electric circuit breaker 60, applied in a conventional manner, is provided between the system and the DC power source. This circuit breaker 60 is operated by the control 70 in response to an operator's command or to fault conditions forcing the circuit breaker to an open condition. The line breaker 60 incorporates two separately controllable contactors 60A and 60B. Contactor 60A provides a direct connection between line filter inductance means 62 and the DC link conductor 40. Contactor 60B is in series with a line filter resistor 64 and provides a resistive connection between inductance means 62 and conductor 40. In operation, contactor 60B is first closed so that charging of the filter capacitance means 54, 56 occurs through resistor 64 in order to limit initial current since the capacitance means appears as a short-circuit at power turn-on. Once the capacitance means 54, 56 has charged to substantially the value of the power source 12, the contactor 60A is closed and shunts the resistor 64. Typically, the resistor 64 may have a value of about 1.04 ohms.

In the illustrative system of FIG. 1, the closed contactor 66 represents a current collector in sliding contact with a wayside conductor. The contactor 66 may be a pantograph for an overhead conductor or a spring biased shoe for contacting a third rail as described in the aforementioned U.S. patent application Ser. No. 07/630,698.

Current to the propulsion system is monitored by a current monitor 68 of a type well known in the art. Monitor 68 generates a signal $I_L$ representative of the magnitude and frequency of current in the DC conductor 40. The voltage at DC link conductor 40 is indicated by signal $V_L$ obtained through buffer resistor 76 connected to conductor 40.

The filter capacitance means 54, 56 can be discharged through discharge resistance means 78 via discharge contactor 80. The discharge of capacitance means 54, 56 may be desirable for safety during maintenance.

Figure 2:
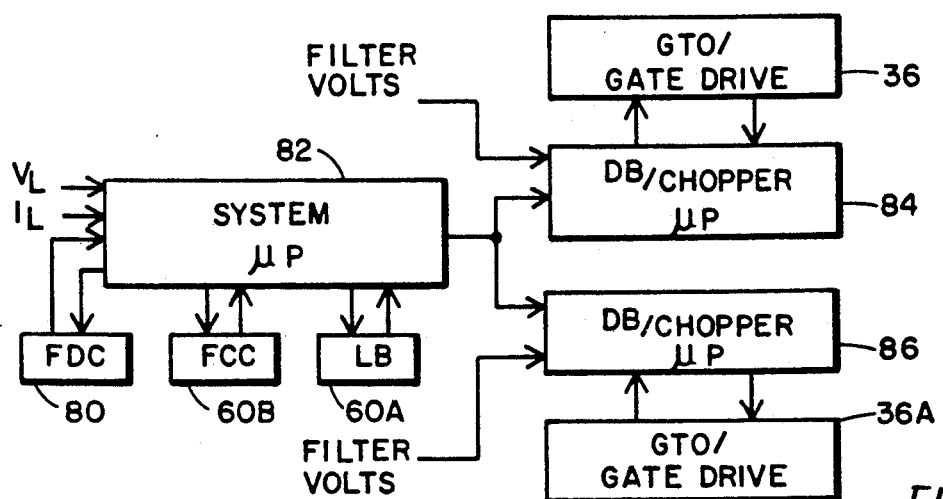
FIG. 2 is a simplified block diagram of the microcomputer distribution in the control of the system of FIG. 1.

In a typical transit vehicle, there will be a second voltage source inverter, in addition to the inverter thus far described, for supplying alternating current to two more traction motors for propelling the vehicle. A power conversion system including such an additional inverter and with third and fourth AC motors being connected to the set of the AC terminals on its motor side is illustrated in FIG. 1. In FIG. 2, components common to those already described above are designated by the same reference numerals plus the suffix "a".

The positive DC terminals 22a on the source side of the second inverter 20a is connected, via the conductor 40 of the DC link, to the line 17 of positive potential, and the relatively negative DC terminal 24a is connected, via a separate conductor 41a and the common conductor 42, to the other line 19 of the DC power source 12. The AC terminals 26a, 28a, and 30a of the inverter 20a are respectively connected to three different phases of each of the AC motors 16a and 18a. A second DC link capacitor 54a individually associated with the inverter 20a, is directly connected between the DC terminals 22a and 24a, and a line capacitor 56 shared by both of the inverters 20 and 20a and both of the choppers 36 and 36a spans the conductors 40 and 42 of the DC link capacitors 54 and 54a during the motoring mode of operation of the conversion system.

A second dynamic braking circuit, comprising the series combination of another dynamic braking resistor 34a and a second electric power chopper 36a, is connected between the DC link conductors 40 and 42 and hence across the line capacitor 56. A second additional ohmic resistance means 46a bypassed by a diode 48a is connected in the path of current between the capacitors 54a and 56. The diode 48a is poled to conduct DC link current during motoring, thereby effectively short circuiting the resistor 46a. But, it blocks current during electrical braking so that the resistor 46a is then inserted in the braking current path and causes a substantially higher voltage to develop across the DC link capacitor 54a than across the line capacitor 56. As before, the current path between the capacitors 54a and 56 is characterized by the absence of appreciable inductance.

In addition to sharing the common shunt line capacitor 56, the two inverters 20 and 20a utilize the same series line-filter inductance means 62 which is connected on the DC power source side of the capacitor 56 between the DC link conductor 40 and the line 17.

The two inverters 20 and 20a are controlled from a common control means 70 which responds to alternative command signals from interlocked throttle and brake controllers 72 and 74, respectively. The control means 70 also receives feedback signals representative of sensed values of voltage, current, and other selected variables in each of the inverters 20 and 20a. To operate in a dynamic braking mode, the control means 70 derives a train of suitably timed periodic signals that determine the repetitive on and off intervals of the choppers 36 and 36a, and it varies the ratio of these intervals as desired. This signal train is fed over a line 76 to the first chopper 36 and also to suitable means 77 for splitting it into a separate train of periodic signals that are displaced from the signals of the original train on the line 76 by a length of time corresponding to approximately one-half the period of such signals. The separate signal train is fed over a line 78 to the second chopper 36a. In this manner, the two choppers are coordinated so as to operate alternately rather than in unison. That is, the "on" periods of chopper 36a are staggered in time with respect to the "on" periods of chopper 36. This staggering reduces the amplitude and increases the frequency of the braking current traversing the line capacitor 56, thereby making it much easier for this capacitor, which is then acting as a filter for attenuating the harmonics generated by operation of both of the choppers, to perform its filtering function.

There are a number of components in the power circuit of FIG. 1 which are essential to the operation of the dynamic braking system. Because of the importance of electrical braking in transit vehicles, it is desirable to check the integrity of selected components so as to provide direction to the location of a failure and to allow the system to take appropriate action for operation in a degraded mode. For example, the system could allow for partial propulsion and/or braking. Preferably, the system could check for shorted dynamic braking resistors, open filter charge resistor circuit, shorted chopper circuit, and an open circuit condition of the dynamic brake resistor or chopper circuit. Each of these checks are desirably implemented by software programming of the microcomputer incorporated in control 70.

Before referring to the flow charts for the system, reference is first made to the simplified block diagram of FIG. 2. In this block diagram, a system microcomputer 82, which may be part of the control 70, monitors the line voltage from DC power source 12, the filter voltage at the DC link conductor 40, and also the current $I_L$ into the DC link conductor 40. In response to the monitored voltage and current and to system operating commands, the system microcomputer controls the filter discharge contactor 80, the filter charge contactor 60B, and the line breaker contactor 60a. The status of each of these contactors is also monitored as inputs to the system microcomputer. The system microcomputer 82 also provides commands to the dynamic brake choppers 36, 36A for enabling dynamic or regenerative braking of the transit vehicles. Each of the dynamic brake choppers 36, 36A includes its own microcomputer 84, 86 for controlling the on and off operation of the gate turn off (GTO) devices within the choppers. The chopper microcomputers 84, 86 are also responsive to the measured filter voltage at link conductor 40 for controlling the time ratio of conduction of the gate turn off devices.

Figure 3:
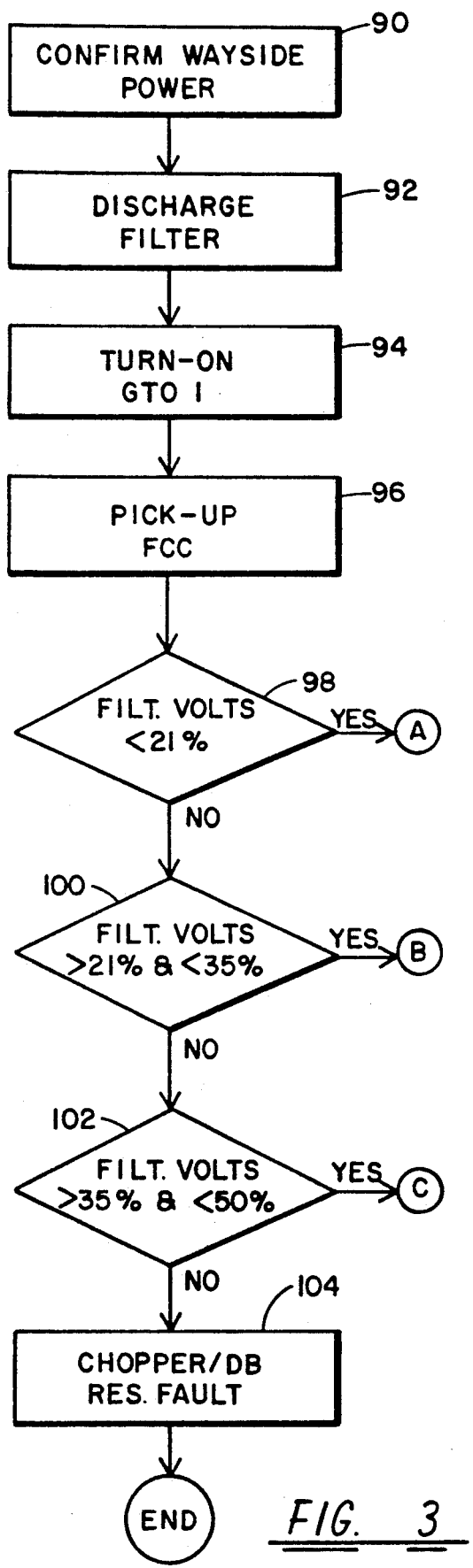

Turning now to FIG. 3, there is shown a flow chart for a program operable in the system microcomputer for determining the status of selected components in the power conversion system. As a first step, the microcomputer confirms that voltage is available at the DC power source 12. Assuming that such voltage is available and is above a preselected minimum value such as, for example, 400 volts, and that the system is not in a propulsion or electrical braking mode of operation, the microcomputer enables contactor 80, block 92, for discharging the filter capacitors 54, 54a, and 56 through the filter discharge resistors 78, 78a. After the line filters are discharged, the chopper circuits 36 and 36a are enabled, block 94, to thereby place the dynamic brake resistors 34 and 34a across the input power conductors 40, 42. In block 96, the filter charge contactor 60B is energized to thereby connect the DC power source 12 to the link conductor 40 through the filter charge resistor 64.

At this point, it is worth noting that the dynamic brake resistors 34 and 34a are essentially in parallel across the link conductors 40 and 42. The filter charge resistor 64 is in series with the parallel combination of resistors 34 and 34a. Accordingly, the magnitude of voltage which should appear between the conductors 40 and 42 can be computed from the resistive voltage divider circuit using the magnitude of voltage at the DC power source 12. In the illustrative embodiment, the ohmic value of each of the resistors 34 and 34a is 0.795 ohms and the value of resistor 64 is 1.04 ohms. Using the well known voltage divider formula, it can be shown that the ideal voltage between conductors appearing 40 and 42 should be 28% of the voltage of the DC power source 12. If either one of the resistors 34 and 34a is shorted, the voltage between the conductors 40 and 42 should be essentially zero volts or at least less than some predetermined value such as, for example, 21% of the magnitude of the voltage from source 12. On the other hand, if one of the resistors 34 and 34a is open circuit, the magnitude of voltage between the conductors 40 and 42 will increase since the effective resistance between the conductors has been increased. Using the ohmic values identified above, the voltage between conductors 40 and 42 with one of the resistors 34 and 34a open circuit should rise to about 43% of the voltage of DC source 12. If both resistors 34 and 34a are open circuit, the voltage between lines 40 and 42 will rise to a value greater than 50% of the voltage of the DC power source 12. The above conditions are implemented in the computer program of FIG. 3.

Referring again to FIG. 3, after the contactor 60B has been picked-up, the program steps to decision block 98 to determine if the filter voltage, i.e., the voltage between conductors 40 and 42, is less than or greater than 21% of the voltage of DC source 12. The program also determines whether the voltage is between 21% and 35%, block 100, or between 36% and 50%, block 102. Before turning to the subprograms which are called if the answer to any of the tests in blocks 98, 100, and 102 are true, it will first be assumed that the answer in each of the block tests turns out to be not true. If the filter volts are not less than 21%, the next check occurs in block 100 to determine whether the filter voltage is between 21% and 35%. Assuming that the voltage is not between 21% and 35%, the program next determines whether the voltage is between 36% and 50% of the DC power source voltage, block 102. If the voltage is actually greater than 50% of the DC source voltage from source 12, the program outputs a chopper fault message, block 104, and ends, the assumption being that both choppers 36, 36a are inoperative or that both resistors 34, 34a are open circuit. As mentioned above, the chopper fault message may be utilized to direct maintenance personnel to service a particular propulsion system or may be utilized to restrict operation of the electrical braking and/or propulsion system of a vehicle.

Figure 4:
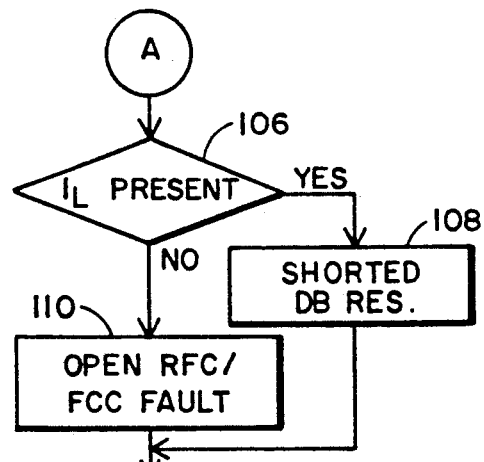
FIGS. 3-10 are flow charts of the program implemented in the system of FIG. 2 for evaluating the operability of selected components in the system of FIG. 1 in accordance with the present invention.

Turning back to block 98, if the check indicates that the filter voltage is actually less than 21%, the program branches to FIG. 4. In FIG. 4, the decision block 106 verifies that current is actually flowing through the link conductor 40. If current is flowing, the decision block indicates that one of the dynamic braking resistors 34, 34a is short circuited, block 108. Alternatively, if the check indicates that no current is flowing in the link conductor 40, the program steps to block 110 indicating that either the line breaker 60B is frozen in an open condition or more likely, the filter charge resistor 64 is open circuit. This portion of the program then ends.

Figure 5:
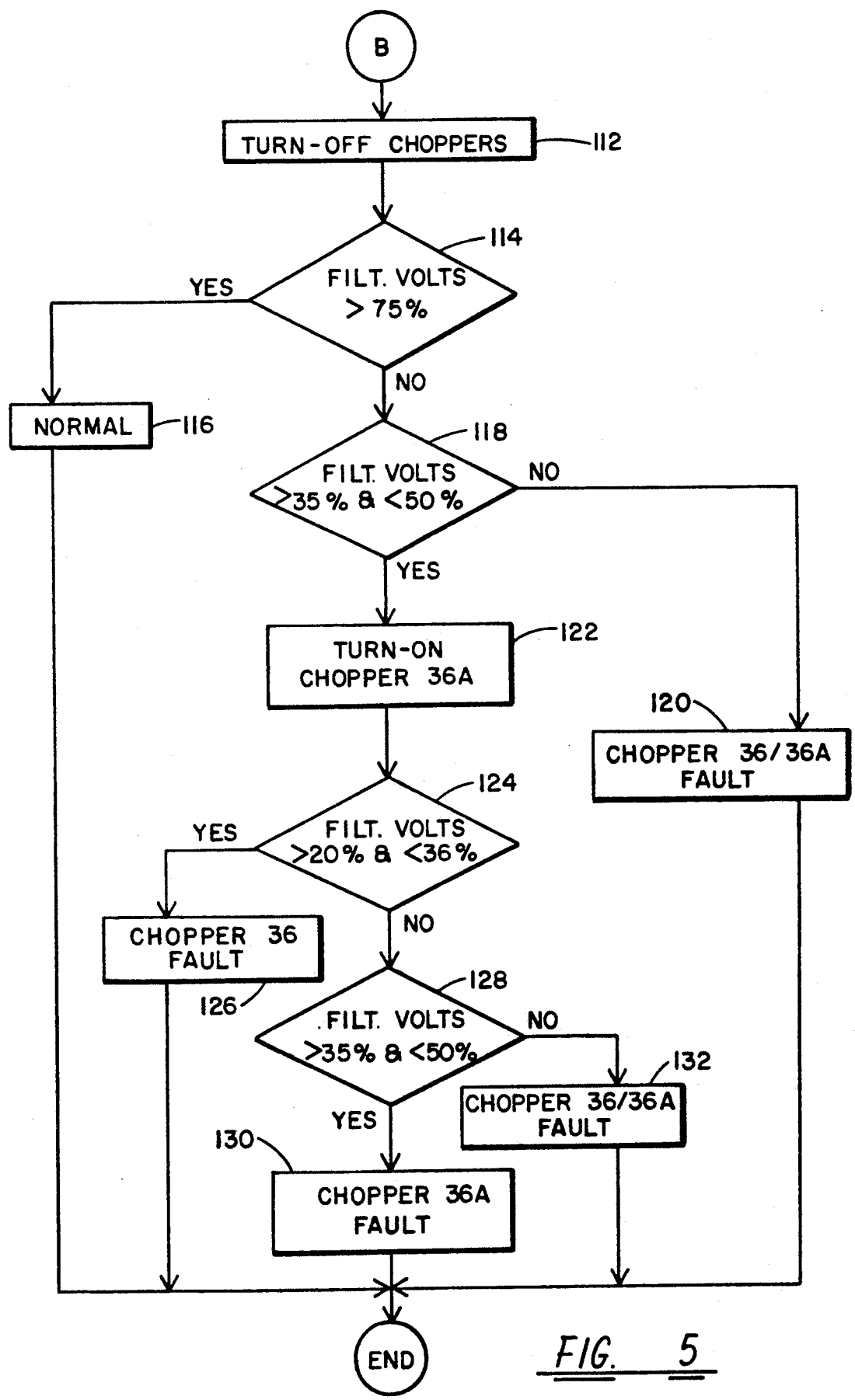

Turning now to FIG. 5, there is shown a branch program which is implemented when the decision block 100 of FIG. 3 indicates that the voltage at link conductor 40 is between 21% and 35% of the voltage of DC source 12. As mentioned above, the ideal voltage at link conductor 40 should be 28% of the value of DC source 12 and the range between 21% and 35% includes this ideal voltage. This additional testing is necessary since an open circuit condition in one of the chopper circuits 36, 36a may result in a voltage falling within the range between 21% and 35% if some other value has changed in one of the chopper circuits. Furthermore, the additional testing can be used to verify that the chopper circuits are responsive to commands to turn off or cease conduction. As a first step, both of the chopper circuits 36 and 36a are turned off or disabled, block 112. The voltage at link conductor 40 is then monitored to determine if it is greater than 75% of the voltage at the DC power source 12 with both the choppers disabled. If the voltage is greater than 75%, the decision block 114 indicates normal operation of the circuit, block 116 and exits. If, however, with both of the choppers 36 and 36A commanded to be off, the voltage is less than 75%, the decision block 118 then determines whether the voltage falls between 36% and 50% of the source voltage, thereby indicating a failure of one of the chopper circuits to cease conduction. If the measurement determines that the voltage is not between 36% and 50%, the program steps to block 120 indicating that a malfunction exists with both choppers 36 and 36a. If, however, the test at block 118 indicates that the link conductor 40 voltage is between 35% and 50%, then one of the chopper circuits 36, 36a is short circuited. The remaining tests are then designed to isolate whether the first chopper 36 or the second chopper 36a is malfunctioning. The first step in this additional check is to turn on one of the choppers such as, for example chopper 36a, block 122. At decision block 124, the voltage at link conductor 40 is again monitored to determine whether it is between 21% and 35% of the voltage of DC source 12. If the voltage does fall in the range of 21% to 35%, the program steps to block 126 indicating that the chopper circuit 36 is at fault. If the voltage is not between 21% and 35% in decision block 124, the program steps to decision block 128 to determine whether the voltage is between 36% and 50%. If the voltage at link conductor 40 is determined to be within the 36% to 50% range, the program steps to block 130 indicating that the second chopper 36a is malfunctioning. If the voltage is not between 36% and 50%, the program steps to block 132 indicating that one of the chopper circuits 36, 36a is malfunctioning but that the particular one cannot be isolated.

Figure 6:
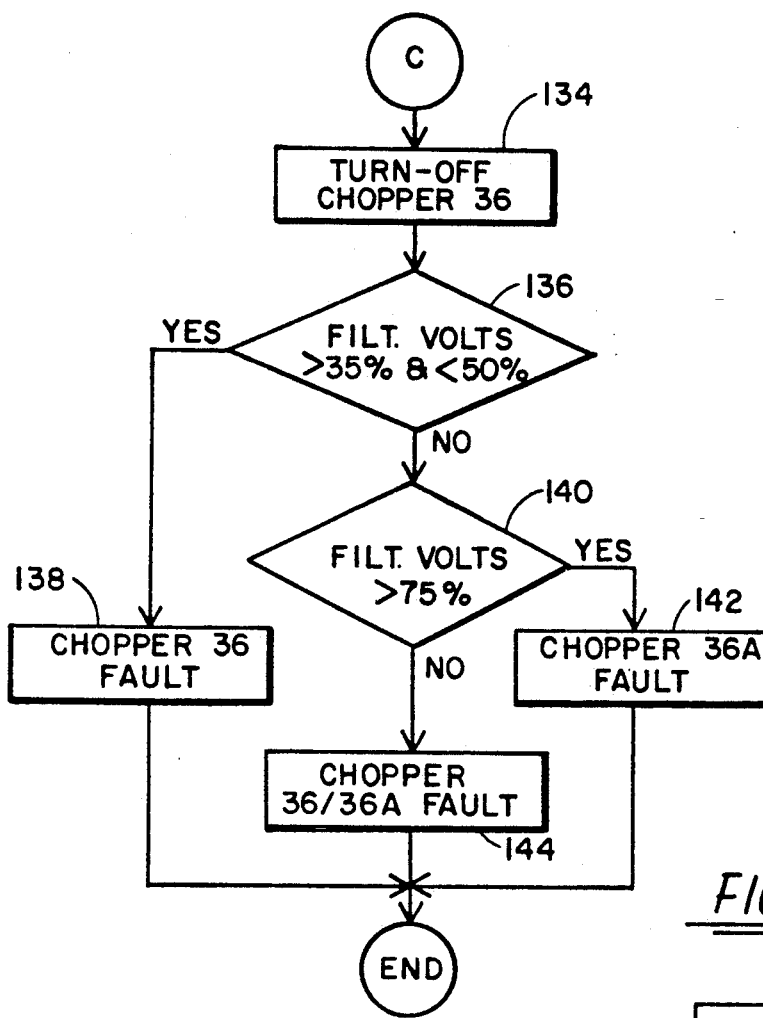

Referring now to FIG. 6, there is shown the branch logic for the condition in which block 102 of FIG. 3 indicates that the link voltage is between 36% and 50% of the DC source voltage thus indicating a malfunction in one of the dynamic brake circuits. At block 134, the first chopper 36 is assumed malfunctioning and is commanded to turn off. At block 136, the voltage at link conductor 40 is again measured to determine if it still lies between 36% and 50% of the source voltage. If the voltage is still between 36% and 50%, the program steps to block 138 indicating that chopper 36 is malfunctioning or resistor 34 is open circuited. If the test at decision block 136 indicates that the voltage is not between 36% and 50% with the first chopper disabled, the program then determines at block 140 if the voltage is greater than 75% of the source voltage. If the voltage is greater than 75%, the program indicates that the second chopper 36a is at fault or the resistor 34a is open circuited, block 142, and ends. If the test at block 140 determines that the voltage is not greater than 75%, the program steps to block 144 indicating a chopper/dynamic brake resistor fault but is inconclusive as to which circuit has failed.

Figure 7:
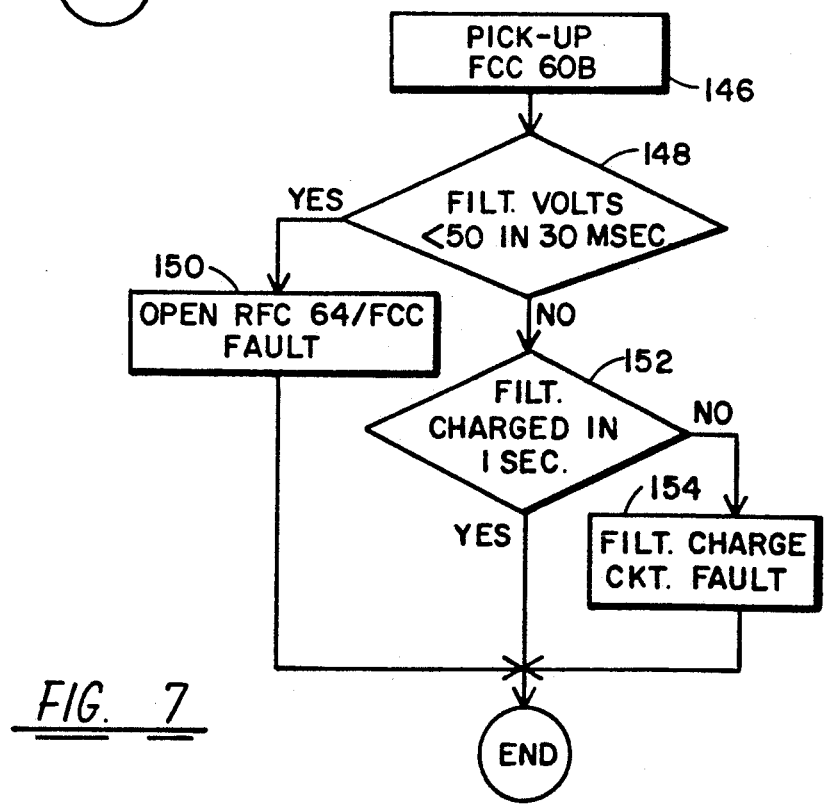

FIG. 7 represents a check of other components in the system with the first and second choppers 36 and 36a disabled. These tests are designed to verify the operability of the filter charging circuit and to assure that the filter charging resistor 64 is not open circuited. In this test, block 146, the filter charge contactor 60B is energized to thereby connect the power source 12 to the link conductor 40 through the filter charging resistor 64. Block 148 indicates the first test to confirm that the filter volts at conductor 40 rise to more than some predetermined value in a predetermined time depending on the voltage from source 12, the charging resistance, the series inductance, and the capacitance. In the illustrative case, an example would be fifty volts in thirty milliseconds. If the filter voltage is less than fifty volts at the end of thirty milliseconds, the program steps to block 150 indicating that the filter charging resistor 64 is open circuited (or contactor 60B is inoperative). If the filter voltage is greater than fifty volts in thirty milliseconds, the program steps to block 152 to determine if the filter voltage reaches its full charge, i.e., the same voltage as the DC power source 12, in one second. If the filter is not charged in one second, the program steps to block 154 indicating a charging circuit malfunction. If the filter is charged in less than one second, the program exits thereby indicating satisfactory operation of the filter charging circuit.

Figure 9:
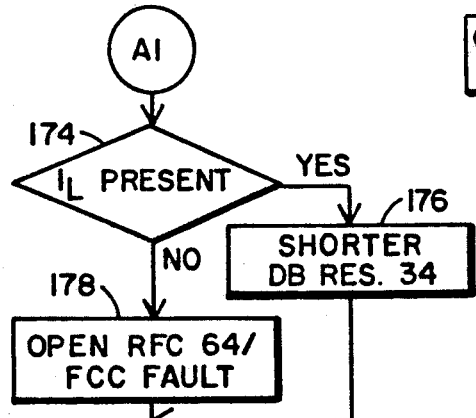
Figure 10:
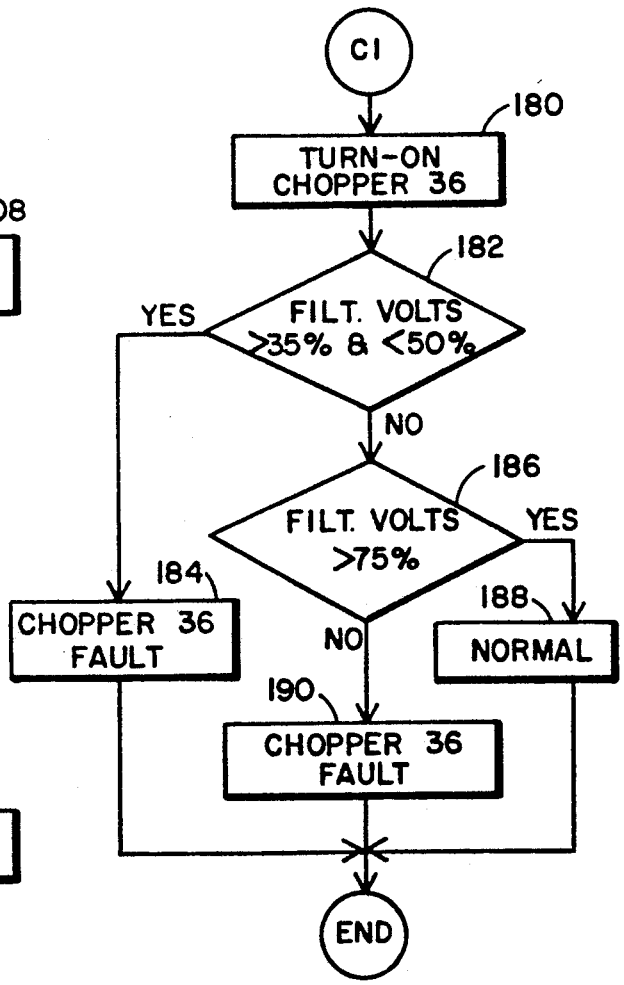
Figure 8:
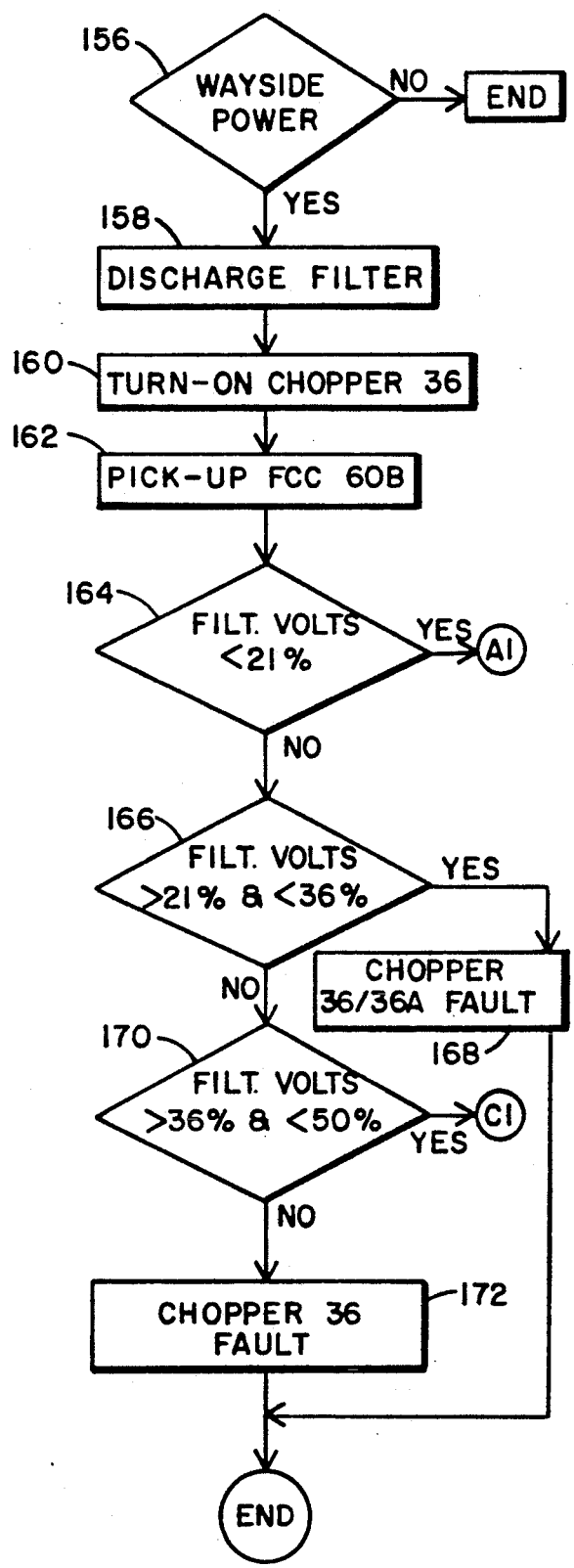

FIGS. 8, 9, and 10 illustrate a program to be implemented in the system microcomputer for evaluating the operation of a single one of the chopper circuits 36 and 36a. As was described above, it is possible that one of the chopper circuits may be deliberately disabled and the system allowed to operate on one of the chopper circuits. For purposes of discussion, it will be assumed that the second chopper 36a has been disabled and the system is to be checked to confirm the operation of the first chopper 36. As was also mentioned, with only one of the choppers operating, the ideal voltage to be developed at the link conductor 40 should be 43% of the voltage of the DC power source 12. The first test at block 156 is to confirm that line voltage is present from source 12. The second step is to discharge the filter capacitors 54, 54a, and 56, block 158. The reason for discharging the filter capacitors is to prevent destruction of the chopper circuits if the choppers are enabled with a full charge on the filter capacitors and the associated dynamic braking resistors are short circuited. After discharging of the filter capacitors, the first chopper 36 is gated into conduction and the filter charging contactor 60B energized, blocks 160 and 162. As described with respect to FIG. 3, the program evaluates the link conductor voltage with regard to three ranges, i.e., less than 21%, between 21% and 35%, and between 36% and 50% of the source voltage at source 12. In the first decision block 164, the program determines whether the filter voltage at link conductor 40 is greater or less than 21% of the source voltage. If the measured voltage is less than 21%, the program steps to the loop indicated by A1 and shown in FIG. 9. If, however, the filter voltage is greater than 21%, the program steps to decision block 166 to determine if the voltage is between 21% and 35%. If the voltage is between 21% and 35%, the program steps to block 168 indicating that there is a fault in the chopper 36a circuit. If the voltage is not between 21% and 35%, the program steps to block 170 to determine whether the voltage is between 36% and 50%. If the voltage is between 36% and 50%, the program steps to the loop indicated at C1 and shown in FIG. 10. Otherwise, the program steps to block 172 indicating again a fault in the first chopper 36 circuit.

Turning to FIG. 9, if the test conducted at block 164 indicates that the filter voltage is less than 21% of source voltage, the first test is to confirm that current is actually flowing in the link conductor 40. If current is flowing, the program indicates that the dynamic brake resistor 34 is shorted, block 176. If the test at block 174 indicates that no current is flowing in link conductor 40, then the program steps to block 178 indicating that the filter charging resistor 62 or contactor 60B is open circuit.

FIG. 10 illustrates the program to be implemented if the test at block 170 in FIG. 8 indicates that the link conductor voltage is between 36% and 50% of the DC power source voltage. In the first step, the first chopper 36 is gated into an off condition, block 180. The program then determines at block 182 whether the voltage at the link conductor 40 is now between 36% and 50% of the source voltage and if so, steps to block 184 indicating that the first chopper 36 has faulted. If the voltage is not between 36% and 50%, the program steps to decision block 186 to determine if it is greater than 75% of the source voltage. If the voltage is greater than 75%, the program steps to block 188 indicating normal operation of the first chopper 36. If the voltage is not greater than 75%, the program steps to block 190 indicating a fault condition of the first chopper 36.

While the principles of the invention have now been made clear in an illustrative embodiment, it will become apparent to those skilled in the art that many modifications of the structures, arrangements, and components presented in the above illustrations may be made in the practice of the invention in order to develop alternate embodiments suitable to specific operating requirements without departing from the spirit and scope of the invention as set forth in the claims which follow.

What is claimed is:

1. A method for determining operability of an electrical dynamic braking system in an electrical propulsion system of an electric traction motor powered vehicle, after powering up the electrical propulsion system but prior to moving the vehicle, the vehicle including at least one electric traction motor connected in driving relationship to at least one set of driving wheels of the vehicle, the braking system including at least one controllable switching means coupled in electrical series circuit arrangement with dynamic braking resistor means, the braking system being coupled between input power lines to the motor for absorbing energy generated by the motor in an electrical braking mode of operation, at least one of the input power lines including a series combination of a controllable line breaker switch and a filter charging resistor, a filter circuit connected to the input power lines and including a filter capacitor for minimizing transients during operation of the propulsion system, the propulsion system including voltage means for monitoring voltage at preselected points and current means for monitoring current to the propulsion system, the method comprising the steps of:

determining the presence of voltage at the input power lines on the input side of the line breaker switch with the line breaker switch in an open circuit condition;

discharging the filter capacitor in the filter circuit;

energizing the at least one controllable switching means for connecting the dynamic braking resistor means across the input power lines;

energizing the line breaker switch for coupling power through the filter charging resistor to the input power lines; and monitoring the voltage at the input power lines for determining the operation of the dynamic braking system wherein voltage less than a first predetermined minimum value is indicative of a shorted condition of the dynamic braking resistor means and voltage greater than a second predetermined minimum is indicative of an open circuit condition of the dynamic braking system.

2. The method of claim 1 further comprising the step of:

monitoring current into the input power lines, the absence of current being indicative of an open circuit condition of the line breaker switch or filter charging resistor and not a shorted dynamic braking resistor means.

3. The method of claim 1 further comprising the step of:

determining if the input power line voltage is greater than the first predetermined minimum value and less than a third predetermined voltage value intermediate said first and second predetermined values wherein an input power line voltage having a value between said first and third predetermined values is indicative of an open circuit condition in the electrical braking system.

4. The method of claim 3 further comprising the steps of:

determining if the voltage at the dynamic braking circuit has a value between the third predetermined voltage and the second predetermined voltage and in response to such value, performing the further steps of:

disabling the controllable switching means in the dynamic braking circuit;

determining if the monitored voltage value remains the same thereby indicating an open circuit fault condition in the dynamic braking circuit;

determining if the monitored voltage value increases above a fourth predetermined value greater than the second predetermined value thereby indicating normal operation of the dynamic braking circuit; and determining if the monitored value is less than the fourth predetermined value thereby indicating an open-circuit fault condition in the dynamic braking circuit.

5. The method of claim 2 wherein the propulsive system includes at least two traction motor power circuits, each power circuit and each power circuit including a dynamic braking system, the method comprising the further steps of, for a monitored voltage greater than the first predetermined value and less than a third predetermined value intermediate the first and second predetermined values:

disabling the controllable switching means to effectively remove the dynamic braking systems from the input power lines;

determining if the monitored voltage is above a fourth predetermined voltage greater than the second predetermined voltage thereby indicating normal operation of each dynamic braking system; and determining if the monitored voltage rises above the third predetermined voltage but is less than the second predetermined voltage thereby indicating a malfunction in only one of the dynamic braking systems.

6. A system for determining operability of an electrical dynamic braking system in an electrical propulsion system of an electric traction motor powered vehicle, after powering up the electrical propulsion system but prior to moving the vehicle, the vehicle comprising:

at least one electric traction motor connected in driving relationship to at least one set of driving wheels of the vehicle;

a braking system including at least one controllable switching means coupled in electrical series circuit arrangement with dynamic braking resistor means, the braking system being coupled between input power lines to the motor for absorbing energy generated by the motor in an electrical braking mode of operation, at least one of the input power lines including a series combination of a controllable line breaker switch and a filter charging resistor.

a filter circuit connected to the input power lines and including a filter capacitor for minimizing transients during operation of the propulsion system;

the propulsion system including voltage means for monitoring voltage at preselected points and current means for monitoring current to the propulsion system, the operability determining system comprising:

means for determining the presence of voltage at the input power lines on the input side of the line breaker switch with the line breaker switch in an open circuit condition;

means for discharging the filter capacitor in the filter circuit;

means for energizing the at least one controllable switching means for connecting the dynamic braking resistor means across the input power lines;

means for energizing the line breaker switch for coupling power through the filter charging resistor to the input power lines; and means for monitoring the voltage at the input power lines for determining the operation of the dynamic braking system wherein voltage less than a first predetermined minimum value is indicative of a shorted condition of the dynamic braking resistor means and voltage greater than a second predetermined minimum is indicative of an open circuit condition of the dynamic braking system.

7. The operability determining system of claim 6 further comprising:

means for monitoring current into the input power lines, the absence of current being indicative of an open circuit condition of the line breaker switch or filter charging resistor and not a shorted dynamic braking resistor means.

8. The operability determining system of claim 6 further comprising:

means for determining if the input power line voltage is greater than the first predetermined minimum value and less than a third predetermined voltage value intermediate said first and second predetermined values wherein an input power line voltage having a value between said first and third predetermined values is indicative of an open circuit condition in the electrical braking system.

9. The operability determining system of claim 8 further comprising:

means for determining if the voltage at the dynamic braking circuit has a value between the third predetermined voltage and the second predetermined voltage and in response to such value, and further comprising:

means for disabling the controllable switching means in the dynamic braking circuit;

means for determining if the monitored voltage value remains the same thereby indicating an open circuit fault condition in the dynamic braking circuit;

means for determining if the monitored voltage value increases above a fourth predetermined value greater than the second predetermined value thereby indicating normal operation of the dynamic braking circuit; and means for determining if the monitored value is less than the fourth predetermined value thereby indicating an open-circuit fault condition in the dynamic braking circuit.

10. The operability determining system of claim 7 wherein the propulsive system includes at least two traction motor power circuits, each power circuit being connected in parallel circuit arrangement to the input power lines and each power circuit including a dynamic braking system, the system further comprising:

means for monitored voltage greater than the first predetermined value and less than a third predetermined value intermediate the first and second predetermined values:

means for disabling the controllable switching means to effectively remove the dynamic braking systems from the input power lines;

means for determining if the monitored voltage is above a fourth predetermined voltage greater than the second predetermined voltage thereby indicating normal operation of each dynamic braking system; and means for determining if the monitored voltage rises above the third predetermined voltage but is less than the second predetermined voltage thereby indicating a malfunction in only one of the dynamic braking systems.

* * * * *